United States Patent
Gao et al.

(10) Patent No.: US 11,636,618 B2
(45) Date of Patent: Apr. 25, 2023

(54) DEVICE AND METHOD WITH SIMULTANEOUS IMPLEMENTATION OF LOCALIZATION AND MAPPING

(71) Applicant: Samsung Electronics Co., Ltd., Suwon-si (KR)

(72) Inventors: Tianhao Gao, Beijing (CN); Xiaolong Shi, Beijing (CN); Xiongfeng Peng, Beijing (CN); Kuan Ma, Beijing (CN); Hongseok Lee, Seoul (KR); Myungjae Jeon, Yongin-si (KR); Qiang Wang, Beijing (CN); Yuntae Kim, Suwon-si (KR); Zhihua Liu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 17/093,944

(22) Filed: Nov. 10, 2020

(65) Prior Publication Data
US 2021/0150755 A1 May 20, 2021

(30) Foreign Application Priority Data

Nov. 14, 2019 (CN) .......................... 201911114325.1
Mar. 4, 2020 (CN) ......................... 202010144849.1
Nov. 5, 2020 (KR) ........................ 10-2020-0147099

(51) Int. Cl.
*G06T 7/73* (2017.01)
*G06T 7/55* (2017.01)

(52) U.S. Cl.
CPC .................. *G06T 7/73* (2017.01); *G06T 7/55* (2017.01); *G06T 2207/10024* (2013.01); *G06T 2207/10028* (2013.01); *G06T 2207/30244* (2013.01)

(58) Field of Classification Search
CPC .... G06T 7/55; G06T 7/70; G06T 7/73; G06T 7/74; G06T 7/97; G06T 2207/10024; G06T 2207/10028; G06T 2207/30244; G06V 10/56; G06V 20/46
See application file for complete search history.

(56) References Cited

U.S. PATENT DOCUMENTS

| 2015/0212521 | A1 | 7/2015 | Pack et al. |
| 2016/0171703 | A1* | 6/2016 | Rhee et al. ............... G06T 7/33 |
| | | | 382/154 |
| 2017/0161546 | A1 | 6/2017 | Cansizoglu et al. |

(Continued)

OTHER PUBLICATIONS

Belongie, et al. "Shape matching and object recognition using shape contexts." *IEEE transactions on pattern analysis and machine intelligence* 24.4 (Apr. 2002): 509-522. (14 pages in English).

(Continued)

*Primary Examiner* — Andrew W Johns
(74) *Attorney, Agent, or Firm* — NSIP Law

(57) ABSTRACT

A simultaneous localization and mapping device is provided. The device includes an image obtaining device configured to capture color images and depth images of a surrounding environment; an initial pose estimating device configured to estimate an initial pose based on the color images and the depth images; a map constructing device configured to construct a three-dimensional map based on the depth images and the color images; and a pose determining device configured to determine a final pose based on the initial pose and the three-dimensional map.

23 Claims, 11 Drawing Sheets

(56) References Cited

U.S. PATENT DOCUMENTS

| | | | |
|---|---|---|---|
| 2019/0073787 A1* | 3/2019 | Lee et al. | G06T 11/60 |
| 2019/0114777 A1 | 4/2019 | Maity et al. | |
| 2019/0206116 A1 | 7/2019 | Xu et al. | |
| 2020/0143603 A1* | 5/2020 | Kotake et al. | G06T 17/00 |
| 2020/0349765 A1* | 11/2020 | Iwamoto et al. | G06T 17/205 |
| 2020/0357172 A1* | 11/2020 | Lee et al. | G06T 7/50 |
| 2021/0358158 A1* | 11/2021 | Peri et al. | G06T 7/73 |
| 2021/0373650 A1* | 12/2021 | Kang et al. | A63F 13/65 |

OTHER PUBLICATIONS

Gálvez-López, et al. "Bags of binary words for fast place recognition in image sequences." *IEEE Transactions on Robotics* 28.5 (2012): 1188-1197. (9 pages in English).

Engel, et al. "LSD-SLAM: Large-scale direct monocular SLAM." *European conference on computer vision*. Springer, Cham, 2014. (16 pages in English).

Mur-Artal, et al. "ORB-SLAM: a versatile and accurate monocular SLAM system." *IEEE transactions on robotics* 31.5 (Oct. 2015): 1147-1163. (17 pages in English).

Younes, et al. "Keyframe-based monocular SLAM: design, survey, and future directions." *Robotics and Autonomous Systems* 98 (2017): 67-88. (22 pages in English).

Pumarola, et al. "PL-SLAM: Real-time monocular visual SLAM with points and lines." *2017 IEEE international conference on robotics and automation (ICRA)*. IEEE, Jun. 2017. (6 pages in English).

Mur-Artal, et al. "Orb-slam2: An open-source slam system for monocular, stereo, and rgb-d cameras." *IEEE Transactions on Robotics* 33.5 (Oct. 2017): 1255-1262. (8 pages in English).

Qin, et al. "Relocalization, global optimization and map merging for monocular visual-inertial SLAM." *2018 IEEE International Conference on Robotics and Automation (ICRA)*. IEEE, Mar. 2018. (8 pages in English).

Liu, et al. "Ice-ba: Incremental, consistent and efficient bundle adjustment for visual-inertial slam." *Proceedings of the IEEE Conference on Computer Vision and Pattern Recognition*. 2018. (9 pages in English).

Qin, et al. "Vins-mono: A robust and versatile monocular visual-inertial state estimator." *IEEE Transactions on Robotics* 34.4 (Aug. 2018): 1004-1020. (17 pages in English).

Gomez-Ojeda, et al. "PL-SLAM: A stereo SLAM system through the combination of points and line segments." *IEEE Transactions on Robotics* 35.3 (2019): 734-746. (13 pages in English).

Extended European Search Report dated Mar. 30, 2021 in counterpart European Patent Application No. 20206725.2 (8 pages in English).

* cited by examiner

DEVICE AND METHOD WITH SIMULTANEOUS IMPLEMENTATION OF LOCALIZATION AND MAPPING

CROSS-REFERENCE TO RELATED APPLICATION(S)

This application claims the benefit under 35 USC § 119(a) of Chinese Patent Application No. 201911114325.1, filed on Nov. 14, 2019, Chinese Patent Application No. 202010144849.1, filed on Mar. 4, 2020 in the China National Intellectual Property Administration, and Korean Patent Application No. 10-2020-0147099 filed on Nov. 5, 2020, in the Korean Intellectual Property Office, the entire disclosures of which are incorporated herein by references for all purposes.

BACKGROUND

1. Field

The following description relates to a device and method with a simultaneous localization and mapping (SLAM) field.

2. Description of Related Art

In a typical method of constructing a three-dimensional map, sensor devices such as cameras, laser sensors, and inertial surveying devices that are installed on various equipment, may be used to obtain information of a surrounding environment in real-time, thereby constructing a three-dimensional map of the surrounding environment, and positions and posture information of the equipment in a world coordinate system are output in real-time. This technique is called simultaneous localization and mapping (SLAM).

Almost all SLAM systems may be based on two frameworks: nonlinear optimization and statistical filtering. According to different hardware sensing devices, the SLAM systems may also be divided into forms of laser sensors, binocular-vision/multi-vision, monocular vision+inertial surveying devices, monocular vision+depth camera, or the like.

Laser sensing technology is a technique that was commonly used in early SLAM systems. The technology has high accuracy and is able to obtain denser map points. However, due to the large volume, large weight, and high cost of laser devices, the laser devices may not be suitable for requirements of current lightweight SLAM systems (for example, drones, augmented reality (AR) glasses, or the like), but the laser devices may still be useful in some equipment that does not need high loads (such as cleaning robots and storage robots). Another technique is the binocular vision/multi-vision-SLAM system, which may estimate approximate depth information of feature points in a scene based on parallax between two cameras, and then further refine, during a back-end optimization operation, an estimated value obtained in a front-end optimization operation. The binocular vision-SLAM technologies, which is more conventional, include open key frame-based visual-inertial SLAM (OKVIS) and oriented fast and rotated brief SLAM (ORB-SLAM).

Additionally, currently, vision-based SLAM technology has also been gradually applied to consumer-grade products. However, when monocular cameras are used in a SLAM system, there are often some problems, such as the need for a more elaborate initialization operation, difficulty in estimating a scale of a motion trajectory, or the like. Therefore, some changes with respect to the monocular cameras have been intensively studied, and at present, the more typical changes include a monocular camera plus an inertia sensor, a monocular camera plus a depth camera, and some fine initialization algorithms. Inertia sensors are more sensitive to movement of equipment. Therefore, such inertia sensors are able to make up for shortcomings of the monocular cameras, and may accurately estimate a pose of equipment when the equipment moves faster or rotates more. The monocular camera plus the depth camera are able to roughly measure a position in a three-dimensional space, and thus, a scale of a motion trajectory may be obtained. Since monocular cameras are lightweight, they are widely used in many consumer-grade products (such as drones, AR glasses, automatic meal delivery robots, or the like).

However, most existing SLAM technologies include a nonlinear optimization portion, and both real-time performance and accuracy are difficult to consider in nonlinear optimization. To ensure the real-time performance, many existing SLAM systems may only use measurement information from a short past period of time when performing nonlinear optimization, and thus better localization accuracy may be difficult to achieve. Additionally, some SLAM systems may often need to work in familiar environments, such as storage robots and food delivery robots. Research into how to use previous map information to allow a calculation amount of a system to be reduced over time is relatively lacking. Many vision-based SLAM technology front-ends use feature-point extraction and feature-point matching to initially track the position of a camera. However, in some scenes with relatively poor textures (such as glass rooms, rooms with more white walls), fewer feature-points may be extracted and matched, leading to decreasing tracking accuracy and producing larger drift errors.

Therefore, a SLAM technology that may ensure real-time performance, reduce an amount of calculation, and ensure the accuracy of maps is needed.

The above-stated information is provided as background information only to help understand the present disclosure. No determination or statements have been made about whether any of the above-stated information can be applied as the related art against the present disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a simultaneous localization and mapping device includes an image obtaining device, configured to capture color images and depth images of a surrounding environment; an initial pose estimating device, configured to estimate an initial pose based on the captured color images and the captured depth images; a map constructing device, configured to construct a three-dimensional map based on the depth images and the color images; and a pose determining device, configured to determine a final pose based on the initial pose and the three-dimensional map.

The map constructing device may include a map reconstructor, configured to reconstruct an initial three-dimensional map based on a first depth image and a first color image of the surrounding environment; and a map updater, configured to update the three-dimensional map based on a second depth image and a second color image of the surrounding environment.

The initial pose estimating device may include a feature extractor, configured to extract feature points from the color images; a feature matcher, configured to perform point-matching on the extracted feature points; and an estimator, configured to estimate the initial pose based on the matched feature points, wherein when a number of the matched feature points is less than a first threshold value, the feature extractor is further configured to extract line segment features from the color images, the feature matcher is further configured to perform line segment matching on the line segment features, and the estimator is further configured to estimate the initial pose based on the matched feature points and the line segment features.

The feature matcher may be configured to perform the line segment matching based on geometric structure information around the line segment features.

The device may further include a full-image tracking device configured to determine, in a previous key frame, a key frame having a common viewpoint with a current frame, wherein the initial pose estimating device is configured to estimate the initial pose by using the determined key frame based on the color images and the depth images.

The device may further include a point and line optimization combination device, configured to create a three-dimensional collinear constraint based on matching results of the line segment features, wherein the pose determining device is further configured to determine the final pose based on the three-dimensional collinear constraint, and the three-dimensional collinear constraint indicates that a point on a line segment of a first frame is on a corresponding line segment of a second frame.

The pose determining device may be configured to determine the final pose by using a preset frame set based on the initial pose and the three-dimensional map, and the preset frame set comprises a plurality of tracking subsets obtained by dividing a tracking set related to a current frame.

The pose determining device may be configured to set a time domain window of a preset size with respect to a current frame, and determine the final pose by using a key frame in the time domain window based on the initial pose and the three-dimensional map.

In a general aspect, a processor-implemented simultaneous localization and mapping method includes capturing color images and depth images of a surrounding environment; estimating an initial pose based on the captured color images and the captured depth images; constructing a three-dimensional map based on the depth images and the color images; and determining a final pose based on the initial pose and the three-dimensional map.

The constructing of the three-dimensional map may include reconstructing an initial three-dimensional map based on a first depth image and a first color image of the surrounding environment; and updating the three-dimensional map based on a second depth image and a second color image of the surrounding environment.

The estimating of the initial pose may include extracting feature points from the color images; performing point-matching on the extracted feature points; and estimating the initial pose by using the matched feature points, wherein when a number of the matched feature points is less than a first threshold value, the estimating of the initial pose further comprises extracting line segment features from the color images, performing line segment matching on the line segment features, and estimating the initial pose based on the matched feature points and the line segment features.

The performing of the line segment matching on the line segment features may include performing line segment matching according to geometric structure information around the line segment features.

The method may further include determining, in a previous key frame, a key frame having a common viewpoint with a current frame, wherein the estimating of the initial pose comprises estimating the initial pose by using the determined key frame based on the color images and the depth images.

The method may include creating a three-dimensional collinear constraint based on matching results of the line segment features, wherein the determining of the final pose further comprises determining the final pose based on the three-dimensional collinear constraint, and the three-dimensional collinear constraint indicates that a point on a line segment of a first frame is on a corresponding line segment of a second frame.

The determining of the final pose may include determining the final pose by using a preset frame set based on the initial pose and the three-dimensional map, and the preset frame set comprises a plurality of tracking subsets obtained by dividing a tracking set related to a current frame.

The determining of the final pose comprises setting a time domain window of a preset size with respect to a current frame, and determining the final pose by using a key frame in the time domain window based on the initial pose and the three-dimensional map.

In a general aspect, an electronic device includes a simultaneous localization and mapping (SLAM) system, comprising: an image capturing device, configured to capture a first color image and a first depth image at a first time period; an image pose estimating device, configured to extract feature points from the captured first color image, and estimate an initial pose based on matched points of the extracted feature points; a map constructing device, configured to construct a three-dimensional map based on the first color image and the first depth image captured at the first time period, and construct an updated three-dimensional map based on a second color image and a second depth image captured at a second time period; and a pose determining device, configured to determine a final pose based on the initial pose and the updated three-dimensional map.

The final pose may be determined based on a preset frame.

Other features and aspects will be apparent from the following detailed description, the drawings, and the claims.

Figure 1:
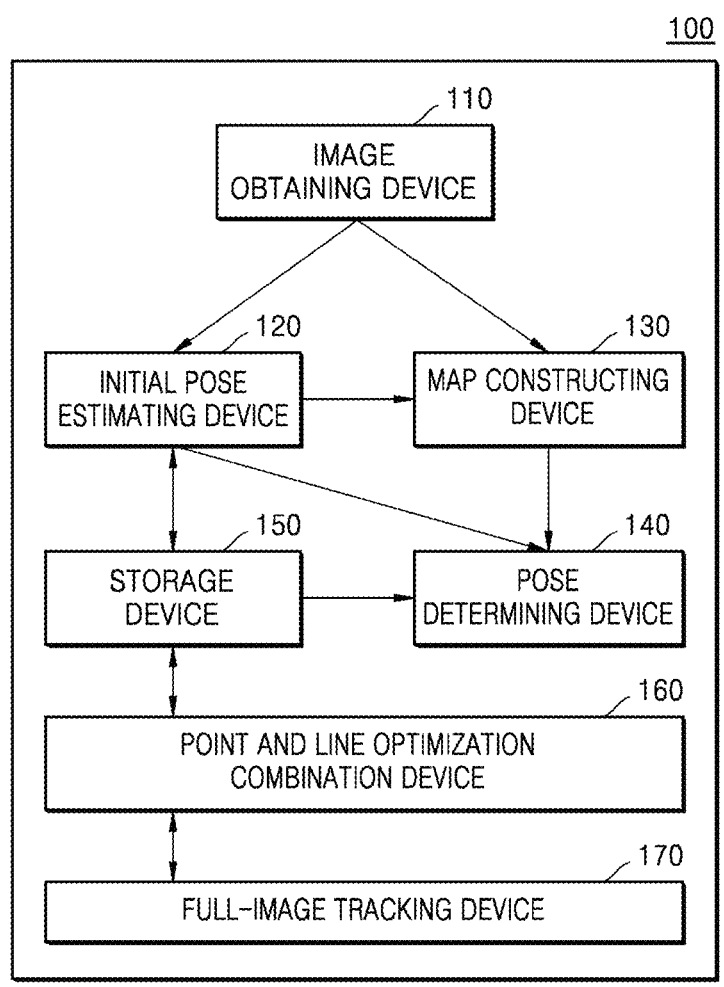
FIG. 1 is a block diagram illustrating an example simultaneous localization and mapping (SLAM) system based on map reconstruction, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

FIG. 1 is a block diagram illustrating an example simultaneous localization and mapping (SLAM) system 100 based on map reconstruction, in accordance with one or more embodiments.

Referring to FIG. 1, the SLAM system 100 based on map reconstruction (hereinafter, referred to as the SLAM system 100) may include an image obtaining device 110, an initial pose estimating device 120, a map constructing device 130, a pose determining device 140, and a storage device 150.

In an example, the image obtaining or capturing device 110 may obtain color images and depth images of a surrounding environment where the SLAM system 100 is currently located, as color images and depth images of a current frame to be processed. Additionally, a "previous frame" mentioned below refers to a frame that has been processed by the SLAM system 100 according to an example, and frames of related information are stored in the storage device 150. The image obtaining device 110 may include, as non-limiting examples, a monocular camera and a depth camera which may respectively obtain the color images and the depth images, but the examples are not limited thereto. The image obtaining device 110 may also be implemented by using any other cameras or camera combinations (for example, a binocular camera) which may capture color images and depth images.

The initial pose estimating device 120 may estimate an initial pose of the SLAM system 100 based on the color images and the depth images. In an example, the initial pose may be a relative pose, which will be described in detail below in conjunction with FIG. 2.

Figure 2:
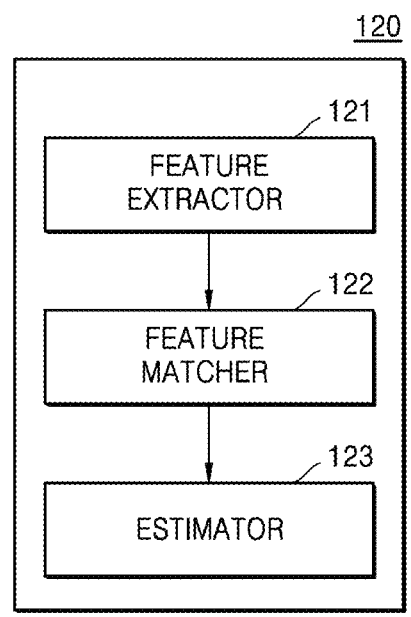
FIG. 2 is a block diagram illustrating an example initial pose estimating device in a SLAM system based on map reconstruction, in accordance with one or more embodiments.

FIG. 2 is a block diagram of an example initial pose estimating device 120 in the SLAM system 100 based on map reconstruction, according to one or more embodiments.

Referring to FIG. 2, the initial pose estimating device 120 may include: a feature extractor 121 configured to extract features from the color images obtained or captured by the image obtaining device 110; a feature matcher 122 configured to perform feature-matching on the extracted features; and an estimator 123 configured to estimate the initial pose of the SLAM system 100 based on the matched features.

In an example, after the feature extractor 121 completes the extracting of the features, the feature matcher 122 may obtain three-dimensional coordinates of each of the extracted features in a camera coordinate system of a current frame according to depth information of the depth images, and then find a matching feature of each extracted feature in another frame according to local information of the features, and obtain three-dimensional coordinates of the matching feature in the other frame in the camera coordinate system. In an example, the other frame may be a particular frame among previous frames, which will be described in more detail below. Feature related information obtained by the feature extractor 121 and the feature matcher 122 may be stored in the storage device 150 as related information with respect to the current frame to be used in subsequent processing.

As only an example, the feature extractor 121 may extract point-features from the color images of the current frame, and the feature matcher 122 may perform point matching on the point-features. In particular, the feature matcher 122 may find, in a particular frame among the previous frames, a point-feature matching the point-feature extracted by the feature extractor 121. Thereafter, the estimator 123 may estimate the initial pose of the SLAM system 100 by using the matched point-features. A method of performing feature matching by using point-features is known to those of ordinary skill in the art, so detailed descriptions thereof will be omitted for simplicity of explanation.

Additionally, when an environmental texture in which the SLAM system 100 is located is relatively lacking (for example, in a glass room, a room with uniform color, or the like), a smaller number of matched point-features may be obtained, causing a large error or direct failure of the SLAM system 100. Additionally, preferably, in an example, when the number of point-features matched by the feature matcher 122 is less than a first threshold value (for example, 20), the feature extractor 121 may further extract line segment features from the color images of the current frame, and the feature matcher 122 may further perform line segment matching on the line segment features, that is, the feature matcher 122 may find, in a particular frame, line segment features that match the line segment features extracted by the feature extractor 121. At this time, the estimator 123 may estimate the initial pose of the SLAM system 100 by using both the matched point-features and the matched line segment features.

In an example, a feature descriptor may be arranged for the line segments so as to perform feature matching by using the extracted line segment features. At this time, due to the lack of environmental texture, the utilization efficiency of local grayscale information around the line segment features is low. Therefore, in an example, the line segment features may be described according to relative shape information between the line segments. Specifically, any one line segment extracted from the color images may be used as a reference line segment, and then the feature descriptor may be created based on relative positions and relative angles, which correspond to the reference line segment, of all remaining line segments in the color images. Midpoint coordinates of a line segment are used to indicate a position thereof. For example, a vector form $v_i(k)$ of a descriptor of any line segment i may be expressed by Equation 1 below:

$$v_i(k) = \#\{q \neq p_i; (q-p_i) \in \text{bin}(k)\}$$

Equation 1:

Where bin(k) represents a k-th area among a plurality of areas in the color images, and k is an area label. $p_i$ represents the midpoint coordinate of the line segment i, and q represents the midpoint coordinate of a line segment other than the line segment i.

Figure 4:
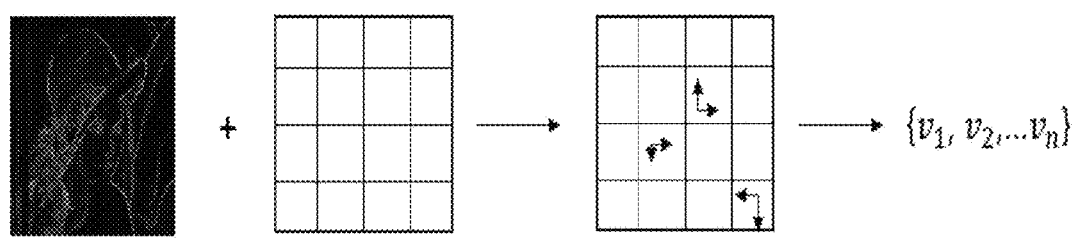
FIG. 4 is a diagram illustrating an example generation of line segment feature descriptor vectors, in accordance with one or more embodiments.

FIG. 4 is a diagram illustrating generation of line segment feature descriptor vectors.

In FIG. 4, $\{v_1, v_2, \ldots, v_n\}$ respectively indicates a line segment feature descriptor vector of a first area, a second area, . . . , and an n-th area in a color image, for example, a 4×4 block area shown in FIG. 4.

The feature matcher 122 may perform line segment matching according to geometric structure information around line segment features. In detail, the feature matcher 122 may calculate a Euclidean distance between two line segment feature descriptor vectors of a current frame and the particular frame to find the best line segment match. Herein, to ensure a correct rate of matching, in an example, it may be set that the best line segment match is two line segments being the best matches in their respective corresponding images.

In an example, since a depth image of the current frame may provide depth information, the estimator 123 may use the matched point-features and/or segment features to perform an estimation on a pose change between the current frame and a particular frame based on an iterative closest point (ICP) method, so as to obtain the initial pose of the SLAM system 100. In other words, the initial pose of the SLAM system 100 obtained with respect to the current frame corresponds to a relative pose with respect to the particular frame. Additionally, the examples are not limited thereto, and other suitable methods may be used to estimate the initial pose of the SLAM system 100.

Additionally, in an example, when the SLAM system 100 enters a particular environment for the first time, the estimator 123 may directly set the initial pose of the SLAM system 100 at this time to a zero vector.

Additionally, in an example, when the number of the matched point-features is very small, for example, when the number of point-features in the particular frame matching the point-features extracted by the feature extractor 121 is less than a second preset threshold value (for example, 5), a relative pose estimated by point-feature matching may no longer be reliable. At this time, the estimator 123 may determine the initial pose of the SLAM system 100 to remain the same as the relative pose of the SLAM system 100 in the particular frame.

Additionally, in an example, the particular frame may be a previous frame or several surrounding frames of the current frame. However, when only a relationship with the several surrounding frames of the current frame is used to establish a constraint on the current frame, the number of frames which may establish a link with the current frame is reduced when the SLAM system 100 moves fast or rotates large, and thus, the accuracy of the SLAM system 100 may be affected. Therefore, preferably, the SLAM system 100 according to an example, may further include a full-image tracking device 170. The full-image tracking device 170 may find a common-view key frame (that is, a common viewpoint may be seen in the current frame and the common-view key frame, and a projection point corresponding to the common viewpoint exists), the common-view key frame having a common viewpoint (for example, a common-view feature-point) with the current frame among previous frames (for example, previous key frames), wherein the common-view key frame may be used to further establish a constraint on the current frame. In this example, the particular frame may further include the common-view key frame. In other words, the feature matcher 122 may also find features matching the features extracted by the feature extractor 121 (including point-features and line segment features) in the common-view key frame, such that the estimator 123 may further use the matched features to estimate the initial pose. The full-image tracking device 170 will be described in detail below with reference to FIGS. 5 to 7.

Figure 5:
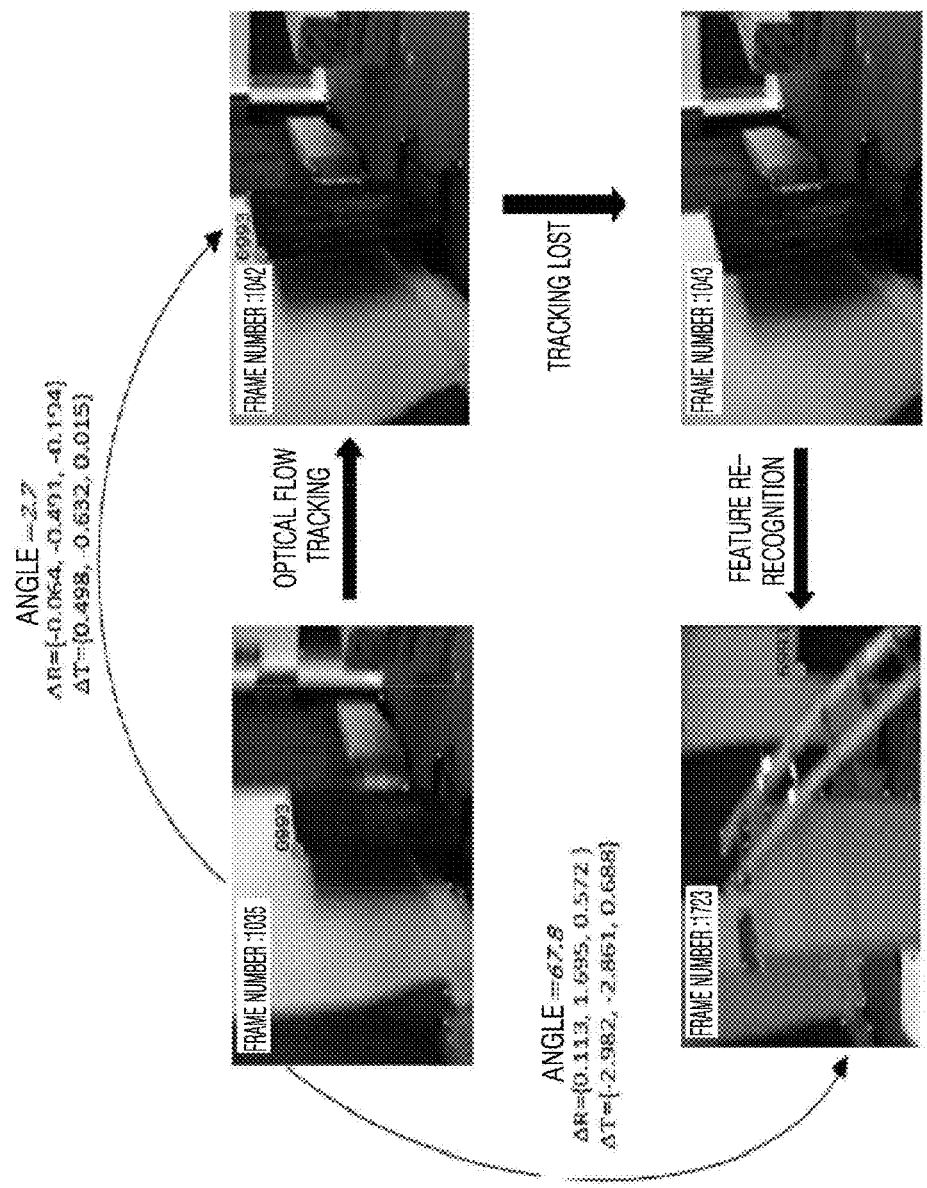
FIG. 5 is a diagram illustrating an example feature re-recognition operation, in accordance with one or more embodiments.
Figure 6:
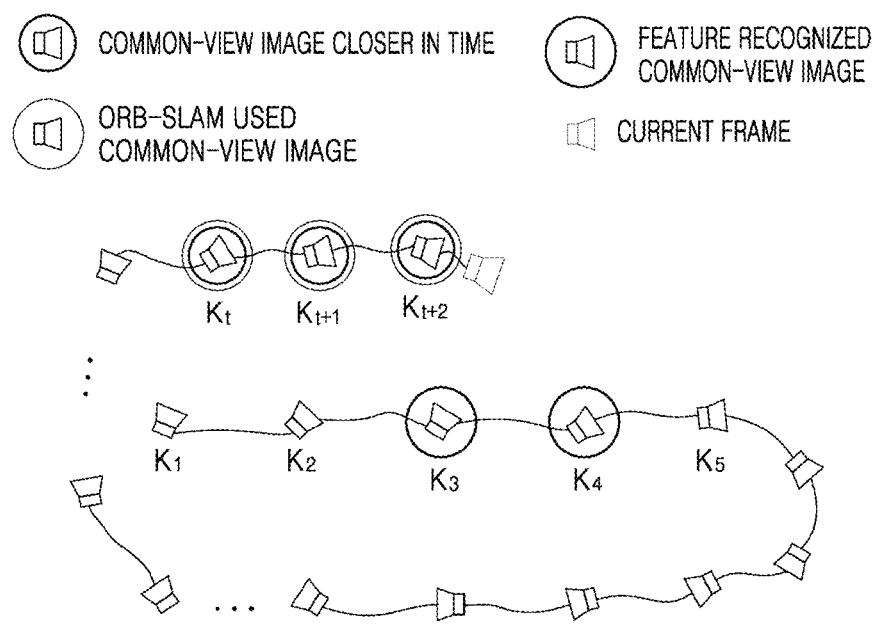
FIG. 6 is a diagram illustrating an example key frame selection of a full-image tracking device, in accordance with one or more embodiments.
Figure 7:
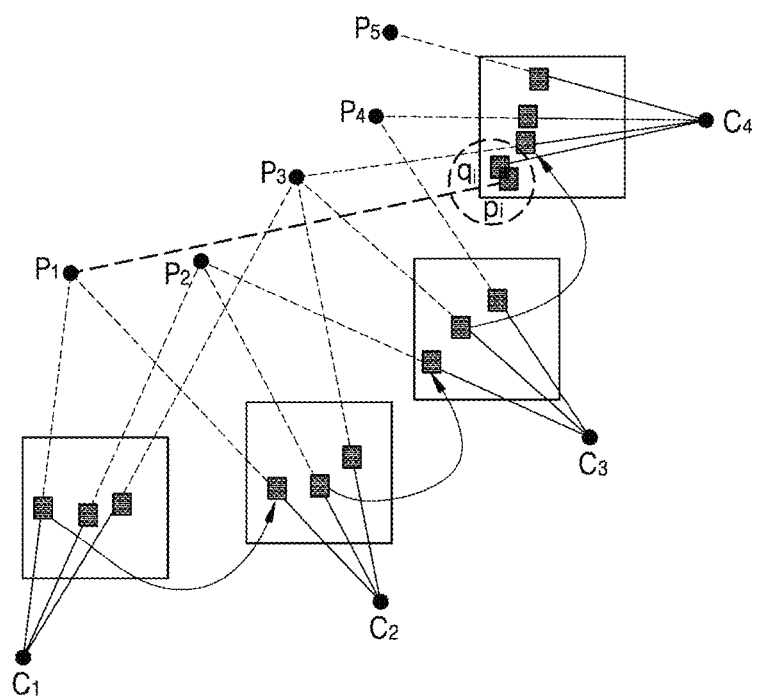
FIG. 7 is a diagram illustrating an example full-picture tracking operation of a full-image tracking device, in accordance with one or more embodiments.

FIG. 5 is a diagram illustrating a feature re-recognition operation. FIG. 6 is a diagram illustrating key frame selection of a full-image tracking device. FIG. 7 is a diagram illustrating a full-picture tracking operation of a full-image tracking device.

Referring to FIG. 5, a feature point labeled as 6993 is extracted from an upper left image with frame number 1035, the feature point labeled as 6993 is tracked in an image with frame number 1042 from the image with frame number 1035. The tracking of the feature is lost in an image with frame number 1043 because a ladder blocks the feature in the image with frame number 1043. However, in an image of frame number 1723, the feature is re-recognized. An angle between the frame from which the feature is extracted (that is, a frame with frame number 1035) and the frame from which the feature is re-recognized (that is, a frame with frame number 1723) is 67.8 degrees, and a translation distance thereof is about 3 meters. Since the frames with frame numbers 1035 to 1042 and the frames with frame number 1723 all have a common-view feature point 6993, the frames with frame numbers 1035 to 1042 may also be used to establish a constraint on the frame with frame number 1723. This may increase the number of features that produce constraints between frames and a wide and stable constraint may be found for the current frame (that is, more frames that may establish constraints on the current frame may be found), and thus the localization accuracy of the SLAM system 100 may be improved.

Optionally, since the previous frame or surrounding frames of the current frame have been used to perform initial pose estimation, using the common-view key frame that is closer in time distance to the current frame to perform the initial pose estimation is not meaningful. Therefore, in an example, preferably, the initial pose estimating device 120 may choose to only use a common-view key frame whose time distance to the current frame exceeds a preset time threshold to perform the initial pose estimation. Descriptions will be further made below with reference to FIG. 6.

When selecting a key frame to match with the current frame, due to a burden of calculation, key frame selection may be necessary. Herein, a strategy combining time and space may be used to select a key frame.

Referring to FIG. 6 in an example, for temporal selection, key frames which are closer in time distance to the current frame, such as frames of $K_t$, $K_{t+1}$ $K_{t+2}$ or the like, are closer to the current frame, so many common viewpoints exist between the key frames and the current frame, and thus the final accuracy is not affected much by adding a few common viewpoints. Therefore, a time threshold may be set to find matched features in a key frame which are relatively far away from the current frame in time distance, thereby improving calculation efficiency. Additionally, from a spatial point of view, a series of selection operations may be necessary, for example, feature filtering on points on key frames, feature matching based on a larger baseline, and feature grading operations. After all key frames containing all points sensitive to space-time conditions (that is, points selected through space and time conditions) have been processed, the key frame selection is completed.

An operation of spatially selecting points may be as follows:

First, unstable points may be filtered out. The inverse depth of each map point is iteratively optimized in full image bundle adjustment, so a change of the inverse depth of each map point over a period of time may be calculated. When the change is too large or the inverse depth of a map point is less than zero, the point is considered unstable and removed.

Additionally, points at an edge of an image may also be removed. Herein, through initial estimation of a camera pose (for example, by using the initial pose), a projection point of a map point will be usually projected around a corresponding feature point on the current frame. When a calculated spatial distance between the projection point and the corresponding feature point is too large, the map point may be filtered out.

Thereafter, a description distance (that is, a descriptor) between the projection point and the corresponding feature point may be calculated, and then when the description distance is less than a certain threshold, a feature re-recognition operation may be performed.

Since the points that are sensitive to space-time conditions may often have too wide a baseline with respect to the corresponding points of the current frame, mismatches are likely to occur. Therefore, in an example, an operation of determining a common-view key frame described below with reference to FIG. 7 may be used.

As an example, as shown in FIG. 7, $C_1$, $C_2$, and $C_3$ are key frames, and $C_4$ is a current frame. Here, $C_1$, $C_2$, and $C_3$ are far away from $C_4$, and in a typical method, constraints between $C_1$, $C_2$, and $C_3$, and $C_4$ may not be considered. However, in an example, taking a feature point $P_1$ (here, the feature point $P_1$ is a map point) as an example, the feature point $P_1$ may be seen in the key frame $C_1$ and the full-image tracking device 170 may determine whether the key frame $C_1$ is a common-view key frame of the current frame $C_4$ by performing the following operations:

(1) Projecting the feature point $P_1$ to the current frame $C_4$ according to an initial relative pose relationship estimated by the initial pose estimating device 120, and marking the feature point $P_1$ as a feature point $p_i$;

(2) Calculating spatial coordinates and local grey difference values $d(p_i, q_i)$ of a feature point $q_i$ near the feature point $p_i$ in the current frame $C_4$ and the feature point $p_i$;

(3) Finding a set $\{q_i^k\}$ of all feature points of which respective differences thereof from the local gray difference value of the feature point $p_i$ are less than a preset threshold value in the current frame $C_4$, wherein k=1, 2, 3, ..., m, and finding the number of m;

(4) Comparing a feature descriptor $D(p_i)$ of the feature point $p_i$ and a feature descriptor $D(q_i^k)$ of the feature point $q_i^k$ based on the following Equations 2 and 3 below. Herein, when relative rotation ΔR and relative translation ΔT of the key frame $C_1$ and the current frame $C_4$ are both less than a given threshold (for example, relative rotation threshold $T_{ΔR}$=45 degrees, and relative translation threshold $T_{ΔT}$=2 meters), Hamming distances of an oriented fast and rotated brief (ORB) descriptor $D(p_i)$ of the feature point $p_i$ and the ORB descriptor $D(q_i^k)$ of the feature point $q_i^k$ are directly compared with each other. Otherwise, as shown in Equation (3), a description of the feature point $q_i^k$ may be re-projected (warped) onto the current frame, and then Hamming distances of the ORB descriptors may be compared with each other.

(5) Determining a point with the smallest Hamming distance between ORB descriptors in the above set $\{q_i^k\}$ as a feature point matching the feature point $P_1$, and determining the key frame $C_1$ and the current frame $C_4$ having a common-view feature point $P_1$ using Equation 2 below:

$$\text{select}(p_i, q_i^k) = \begin{cases} 1 & \text{if, haming}(D(p_i), D(q_i^k)) = \min(D(p_i), D(q_i^k))(\text{for each } k) \\ 0 & \text{otherwise if, haming}(D(p_i), D(q_i^k)) \neq \\ & \min(D(p_i), D(q_i^k))(\text{for each } k) \end{cases} \quad \text{Equation 2}$$

Where, $D(q_i^k)$ may be obtained by Equation 3 below:

$$D(q_i^k)) = \begin{cases} \text{warp}(q_i^k) & \text{if, } \Delta R \geq T_{\Delta R} \text{ or } \Delta T \geq T_{\Delta T} \\ q_i^k & \text{otherwise if, } \Delta R < T_{\Delta R} \text{ and } \Delta T < T_{\Delta T} \end{cases} \quad \text{Equation 3}$$

In the above description, the Hamming distance is used to indicate a distance between feature points, but this is only an example, and various other distance representation methods may also be used to determine the distance between feature points.

In an example, when the initial pose estimating device 120 uses a plurality of frames (for example, the above-stated common-view key frame is used in addition to the previous frame of the current frame) to perform pose estimation and obtain a plurality of initial poses, the initial pose estimating device 120 may determine obtained statistical values (for example, average, median, or the like) of the plurality of initial poses as the initial pose of the SLAM system.

Next, referring back to FIG. 1, the map constructing device 130 may construct a three-dimensional map based on the obtained depth images and color images obtained by the image obtaining device 110.

Figure 3:
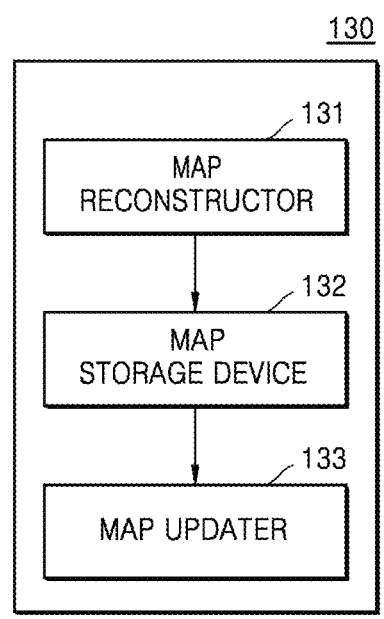
FIG. 3 is a block diagram illustrating an example map constructing device in a SLAM system based on map reconstruction, in accordance with one or more embodiments.

FIG. 3 illustrates a structure of the map constructing device 130 in the SLAM system 100 based on map reconstruction, according to an example.

As shown in FIG. 3, according to an example, the map constructing device 130 may include a map reconstructor 131, a map storage device 132, and a map updater 133.

The map reconstructor 131 may, when entering a particular environment for the first time, reconstruct an initial three-dimensional map based on a first depth image and a first color image of the particular environment. Then, the map updater 133 may update the three-dimensional map based on a second depth image and a second color image of the particular environment when entering the particular environment again.

In detail, when the SLAM system 100 enters a particular environment for the first time, the map reconstructor 131 may reconstruct a three-dimensional map based on depth images and color images obtained when the SLAM system 100 enters the particular environment for the first time, and may determine three-dimensional coordinates of each map point on the reconstructed three-dimensional map (that is, three-dimensional coordinates in the world coordinate system) and the spatial accuracy thereof.

As an example only, the map reconstructor 131 may reconstruct a three-dimensional map by using three-dimensional semantics reconstruction based on depth information included in the depth images and grayscale information included in the color images. In an operation of the map reconstructor 131 using the three-dimensional semantics reconstruction to reconstruct the three-dimensional map, the three-dimensional coordinates of each map point on the three-dimensional map may be determined, and the spatial accuracy of each map point may also be determined. The spatial accuracy may indicate a calculated re-projection error of the map point, and calculation of the spatial accuracy is described below. Additionally, the above-stated three-dimensional semantics reconstruction method is only one of the methods to realize the above operation of three-dimensional map reconstruction, and the present disclosure is not limited thereto. Other suitable three-dimensional map reconstruction methods known in the art may also be used to reconstruct the three-dimensional map and determine the spatial accuracy of each map point.

After completing the three-dimensional map reconstruction, the map reconstructor 131 may store the three-dimensional map with spatial accuracy in the map storage device 132. Herein, since the SLAM system 100 may not obtain a space-time confidence value when entering a particular environment for the first time, the space-time confidence value of the map point on the current three-dimensional map may be set to be zero and stored.

Thereafter, when the SLAM system 100 enters the particular environment again, the three-dimensional map may not have to be reconstructed again. Instead, the map updater 133 may calculate the three-dimensional coordinates of each map point and a space-time confidence value corresponding to the map point based on depth images and color images obtained when the SLAM system 100 enters the particular environment again, and update the three-dimensional coordinates of corresponding map points on the three dimensional map stored in the map storage device 132 and space-time confidence values corresponding to the map points according to the calculated three-dimensional coordinates of each map point and the space-time confidence value corresponding to each map point. The updated three-dimensional map may be implemented as a three-dimensional map constructed by the map constructing device 130 for subsequent use.

Herein, the space-time confidence value of a particular map point on a three-dimensional map usually decreases with the passage of time, and the rate of decrease is generally related to a three-dimensional semantic type of the particular map point. In an example, the space-time confidence value $C_c$ of the particular map point map be determined as in Equation 4 below:

$$C_c = \frac{1}{\exp(-\overline{e} \times \omega 1) + \exp(-(t_2 - t_0) \times \omega 2)} \quad \text{Equation 4}$$

Where, $t_1$ represents a current system time of the SLAM system 100, and $t_0$ represents an initial system time of the SLAM system 100. $\omega 1$ and $\omega 2$ respectively represent spatial weight and temporal weight. $\overline{e}$ represents the re-projection error of the particular map point when performing three-dimensional semantic reconstruction, and may be calculated by Equation 5 below:

$$\overline{e} = \overline{x} - \pi(\varepsilon, X) \quad \text{Equation 5:}$$

In Equation 5, $\overline{x}$ is two-dimensional coordinates of a projection point corresponding to the particular map point, $\varepsilon$ represents a pose of the SLAM system 100 in the world coordinate system and may be obtained based on an initial pose estimated by the initial pose estimating device 120, X represents three-dimensional coordinates of the particular map point in the world coordinate system, and π is a function configured to convert input variables into two-dimensional coordinates.

Therefore, the three-dimensional coordinates and the spatial accuracy of the particular map point may be respectively updated by the following Equations 6 and 7 below:

$$X'_p = \frac{C_p \times P_r \times X_p + C_c \times X_c}{C_p + C_c} \quad \text{Equation 6}$$

$$C'_p = 0.5 \times (C_p + C_c) \quad \text{Equation 7}$$

Here, $X_p$ and $C_p$ are respectively the three-dimensional coordinates of the particular map point stored in the map storage device 132 and the space-time confidence value corresponding to the particular map point, $X_c$ is current three-dimensional coordinates of the particular map point calculated by the map updater 133, and $X_p'$ and $C_p'$ are respectively updated three-dimensional coordinates and space-time confidence value of the particular map point. $P_p$ represents the initial pose of the SLAM system 100 estimated by the initial pose estimating device 120.

After calculating the above $X_p'$ and $C_p'$ values, the calculated $X_p'$ and $C_p'$ values may be respectively used to replace $X_p$ and $C_p$ stored in the map storage device 132, thereby realizing the updating of the three-dimensional map stored in the map storage device 132.

The map storage device 132 is shown as a separate module in FIG. 3. However, this is only an example. In an example, the map storage device 132 may also be integrated with the map updater 133 as a single module.

Through the above updating operation of the map updater 133, whenever the SLAM system 100 enters the same environment, only the stored three-dimensional map may be updated without reconstructing the three-dimensional map each time. Therefore, an amount of calculation needed may be reduced, and the map may be made more accurate, and thus, three-dimensional map points may be fixed in the subsequent use of the three-dimensional map, and only the pose of the SLAM system 100 may be optimized.

Next, referring back to FIG. 1, the pose determining device 140, according to an example, may determine a final pose of the SLAM system 100 based on the estimated initial pose of the SLAM system 100 and the constructed three-dimensional map. In an example, the pose determining device 140 may determine the final pose of the SLAM system 100 by using a preset frame set based on the initial pose and the three-dimensional map. The determined final pose is a pose in the world coordinate system, and the determined final pose may be stored in the storage device 150.

In an example, the final pose may be determined by using global bundle adjustment. Specifically, the pose determining device 140 may perform global bundle adjustment based on Equations 8 and 9 below, to determine the final pose of the SLAM system 100:

$$\psi^* = \text{argmin} \Sigma_{i \in K} \Sigma_{j \in P} \|e^{ij}\| \quad \text{Equation 8:}$$

$$e^{ij} = x^{ij} - \pi(\varepsilon^{iw}, X^{wj}) \quad \text{Equation 9:}$$

In the above Equations 8 and 9, K is a preset frame set and includes the current frame, and for example, may be a set including a key frame and a current frame. P represents a set of feature points extracted by the feature extractor 121. $e^{ij}$ represents the re-projection error of a j-th feature point in the set P of the feature points on an i-th frame in the K set, and when the projection of the j-th feature point does not exist on the i-th frame, $e^{ij}$ may be set to 0. $x^{ij}$ is the two-dimensional coordinates of a projection point of the j-th feature point on the i-th frame. $\varepsilon^{iw}$ represents the pose of the SLAM system in the world coordinate system with respect to the i-th frame. $X^{wj}$ represents the three-dimensional coordinates of the j-th feature point in the world coordinate system, and may be determined based the three-dimensional map provided by the map constructing device 130.

Based on Equation 8 above, to find an optimal solution, a pose of the SLAM system 100 corresponding to each frame in the K set (that is, a pose of the SLAM system 100 when obtaining each frame) may be obtained. At this time, not only the final pose of the SLAM system 100 may be determined, but also a previously determined corresponding pose may be updated with obtained poses of the SLAM system 100 with respect to other frames, thereby continuously improving the localization accuracy of the SLAM system 100.

Additionally, in the operation of finding the optimal solution with respect to Equation 8 above, the initial pose determined by the initial pose estimating device 120 may be used as a reference of $\varepsilon^{iw}$ (for example, a value of $\varepsilon i^w$ may be initially set to the initial pose, and will be adjusted based on the initial pose in subsequent calculations) to speed up the calculation speed.

In an example, the key frame may be a frame selected according to a preset rule among a plurality of frames stored in the storage device 150, for example, a first frame, a fifth frame, a ninth frame, . . . , selected at a preset interval, or may be all stored frames.

When global bundle adjustment is performed based on Equations 8 and 9 above to determine the final pose of the SLAM system 100, for example, for the j-th feature point of the current frame, all common-view frames (that is, the corresponding map feature points of the j-th feature point may be seen on the common-view frames) having corresponding map feature points of the j-th feature point as a common-view feature may be used as a feature tracking set (that is, the preset frame set) related to the j-th feature point to participate in the calculation of the final pose as a whole (for example, in the present disclosure, the full-image tracking device 170 may be used to find the common-view frame), thereby maintaining the global consistency.

However, this takes a long time and may not satisfy the real-time performance of the SLAM system 100, and sometimes, the accuracy of the SLAM system 100 may have to be sacrificed to ensure the real-time performance.

Optionally, when performing global bundle adjustment, the pose determining device 140 may set the preset frame set to include a plurality of tracking subsets obtained by dividing a feature tracking set related to the current frame.

In detail, the pose determining device 140 may divide each feature tracking set related to each feature of the current frame into one or more feature tracking subsets, and determine the final pose of the SLAM system 100 by performing global bundle adjustment based on each feature tracking subset.

In other words, the preset frame set may include one or more feature tracking subsets obtained by separately dividing each feature tracking set related to each feature of the current frame.

Figure 8:
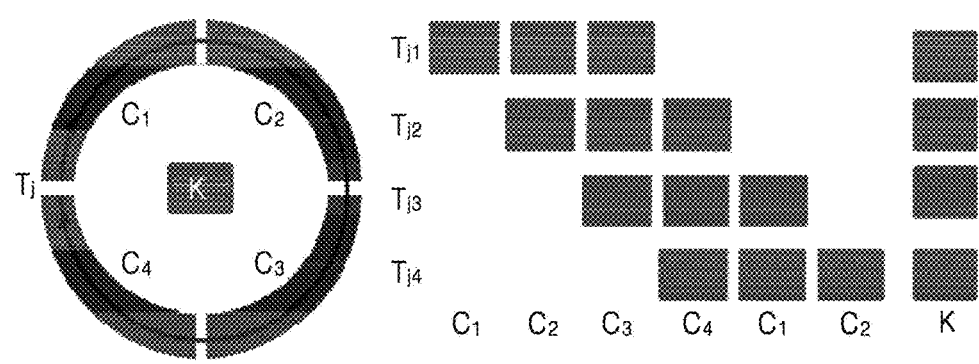
FIG. 8 is a diagram illustrating an example division of a feature tracking set, in accordance with one or more embodiments.

Descriptions of the above will be provided with reference to FIG. 8.

FIG. 8 illustrates a diagram of an example of a division of a feature tracking set, in accordance with one or more embodiments.

Referring to FIG. 8, as an example only, $C_1$ to $C_4$ are assumed to be common-view frames related to the j-th feature point of the current frame, and K is assumed to be a common-view key frame related to the j-th feature point of the current frame.

In other words, a corresponding map feature point of the j-th feature point may be seen in the common-view frames $C_1$ to $C_4$ and the common-view key frame K, and $T_j$ is a feature tracking set of the j-th feature point and is configured by the common-view key frame K and the common-view frames $C_1$ to $C_4$.

In an example, referring to FIG. 8, the pose determining device 140 may divide $T_j$ into subsets $T_{j1}$, $T_{j2}$, $T_{j3}$, and $T_{j4}$, wherein $T_{j1}$ is configured by the common-view key frame K and the common-view frames $C_1$ to $C_4$, $T_{j2}$ is configured by the common-view key frame K and the common-view frames $C_2$ to $C_4$, $T_{j3}$ is configured by the common-view key frame K and the common-view frames $C_1$, $C_3$, and $C_4$, and $T_{j4}$ is configured by the common-view key frame K and the common-view frames $C_1$, $C_2$, and $C_4$.

When the global bundle adjustment method of Equation 8 is used to calculate the final pose of the SLAM system 100, the set of frames involved in a sub-item related to the j-th feature point in Equation 8 are subsets $T_{j1}$, $T_{j2}$, $T_{j3}$, and $T_{j4}$ instead of $T_j$. By calculating a corresponding sub-item based on four shorter subsets, the calculation burden may be effectively reduced.

Additionally, in an example, it may be determined whether the feature tracking set is to be divided based on the number of frames in a feature tracking set corresponding to each feature. In an example, the feature tracking set may be divided into several feature tracking subsets of a preset size only when the number of frames in the feature tracking set exceeds a preset threshold, such that the number of frames in each feature tracking subset is less than or equal to the preset threshold and each feature tracking subset includes a common-view key frame, and all frames in the feature tracking subset covers all frames in the feature tracking set.

Additionally, in an application of the SLAM system 100, in a long trajectory, a considerable number of key frames are accumulated and optimized at the back end. Therefore, the SLAM system 100 may be more likely to fail to work efficiently.

Additionally, in an example, the pose determining device 140 may set a time domain window of a predetermined size with respect to the current frame and use a frame (for example, a key frame located in the time domain window, including a common-view key frame or a non-common-view key frame) located in the time domain window to determine the final pose of the SLAM system 100.

In other words, the preset frame set may also include a key frame located in the time-domain window determined by setting the time domain window of a predetermined size with respect to the current frame.

Figure 9:
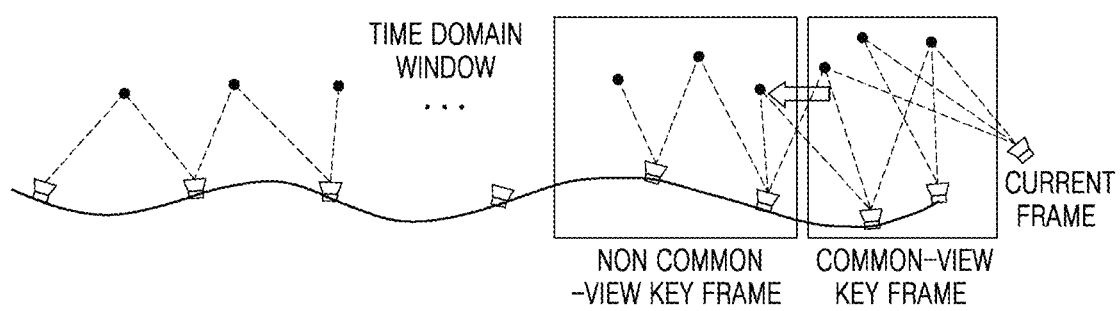
FIG. 9 is a diagram illustrating an example global bundle adjustment based on a time-domain window, in accordance with one or more embodiments.

FIG. 9 is a diagram illustrating global bundle adjustment based on a time-domain window, in accordance with one or more embodiments.

As illustrated in FIG. 9, a time domain window with respect to the current frame may include a common-view key frame, and may also include a non-common-view key frame.

Optionally, the pose determining device 140 may also set a time domain window of a predetermined size with respect to the current frame, use the time domain window to select frames in a feature tracking subset generated in the foregoing operation, remove frames outside the time domain window, and then perform global bundle adjustment based on the feature tracking subset that has undergone the selection operation to determine the final pose of the SLAM system 100, thereby further reducing the calculation load and improving the image processing efficiency.

Figure 10A:
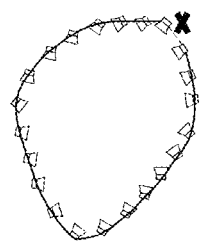
FIG. 10A is a diagram illustrating an example first operation of closed-loop error cancellation, in accordance with one or more embodiments.
Figure 10B:
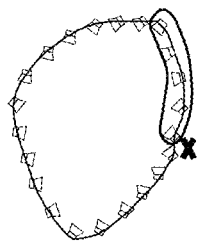
FIG. 10B is a diagram illustrating an example second operation of closed-loop error cancellation, in accordance with one or more embodiments.
Figure 10C:
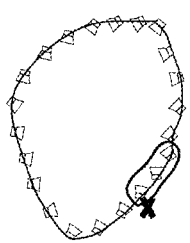
FIG. 10C is a diagram illustrating an example third operation of closed-loop error cancellation, in accordance with one or more embodiments.
Figure 10D:
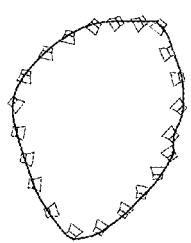
FIG. 10D is a diagram illustrating an example fourth operation of closed-loop error cancellation, in accordance with one or more embodiments.

However, when a loop exists in a motion trajectory of the SLAM system 100, using only key frames in the time domain window instead of all key frames to operate may cause the loop to fail to close, as shown in FIG. 10A.

In an example, closed-loop detection may be used to close the loop, and resulting pose difference values may be passed back to the trajectory in order, thus ensuring that the trajectory is smooth, wherein the operation is illustrated in FIGS. 10A to 10D.

A close-loop error cancellation operation illustrated in FIGS. 10A to 10D is known to those of ordinary skill in the art, so detailed descriptions thereof will be omitted for simplicity of the present disclosure.

Additionally, the point feature is taken as an example to describe a detailed operation of determining the final pose of the SLAM system 100 by the pose determining device 140. However, when the initial pose estimating device 120 also extracts line segment features, the line segment features may be further considered to perform global bundle adjustment.

Specifically, the SLAM system 100, according to an example, may further include a point and line optimization combination device 160, wherein the point and line optimization combination device 160 may establish a three-dimensional collinear constraint based on matching results of line segment features of the feature matcher 122, such that the pose determining device 140 may also determine the final pose according to the three-dimensional collinear constraint.

As only an example, a line segment constraint sub-item corresponding to the three-dimensional collinear constraint may also be added and used in the aforementioned global bundle adjustment method.

Herein, the three-dimensional collinear constraint indicates that a point on a line segment of a first frame is on a corresponding line segment of a second frame.

Specifically, line segment matching between two frames may be obtained according to a line segment descriptor vector. For any one line segment matching, three-dimensional coordinates of the two matched line segments in a camera coordinate system may be obtained. It can be seen that when an end point (spatial three-dimensional coordinates) of any one line segment is transformed into another camera coordinate system through a frame pose, the end point must be above a line segment matching the line segment.

In other words, when calculating the final pose of the SLAM system 100 as in Equation 8, a re-projection error involved in a sub-item on the right side of the equation includes not only the re-projection error of a feature point, but also the re-projection error of a line segment feature.

Herein, a method of calculating the re-projection error of the line segment feature is similar to a method of calculating the re-projection error of the feature point shown in Equation 9, and is known to those of ordinary skill in the art, and thus descriptions thereof will be omitted.

Additionally, the global bundle adjustment is described above, but the present disclosure is not limited thereto. Other methods capable of determining a pose of a device may also be used.

Figure 11:
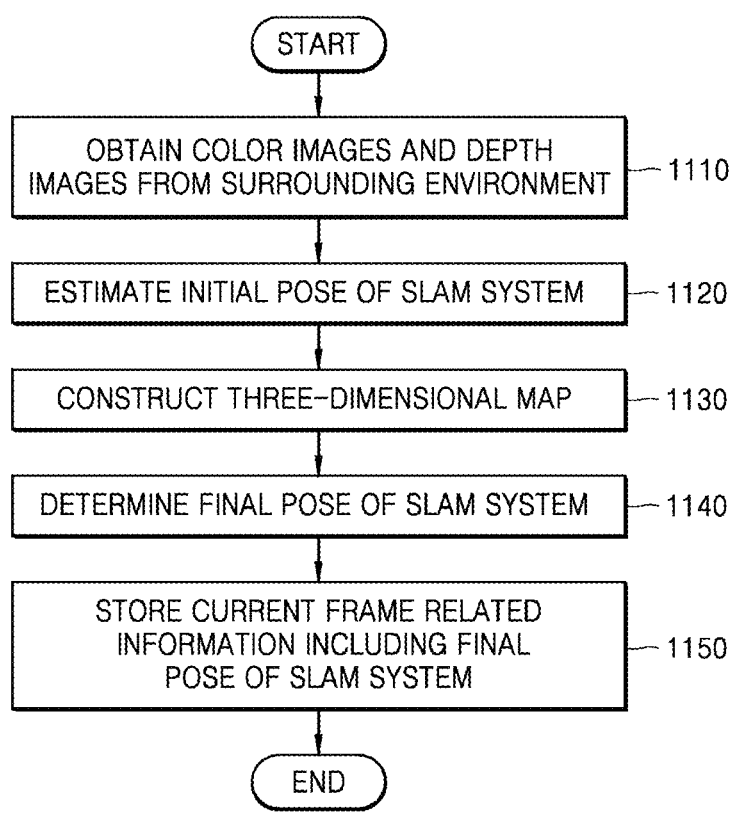
FIG. 11 is a flowchart illustrating an example SLAM method based on map reconstruction, in accordance with one or more embodiments.

FIG. 11 is a flowchart illustrating a SLAM method based on map reconstruction, in accordance with one or more embodiments. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware and computer instructions. In addition to the description of FIG. 5 below, the descriptions of FIGS. 1-9 and FIGS. 10A-10D are also applicable to FIG. 11, and are incorporated herein by reference. Thus, the above description may not be repeated here.

Referring to FIG. 11, in operation 1110, the image obtaining device 110 may obtain or capture color images and depth images of a surrounding environment of the SLAM system 100.

Next, in operation 1120, the initial pose estimating device 120 may estimate the initial pose of the SLAM system 100 based on the color images and depth images obtained in operation 1110.

Specifically, in operation 1120, the initial pose estimating device 120 may extract feature points in the color images, perform point matching according to the extracted feature points, and then estimate the initial pose of the SLAM system 100 based on the matched feature points.

When the number of matched feature points is less than a first preset threshold value, the initial pose estimating device 120 may further extract line segment features in the color images, and perform line segment matching according to the line segment features.

At this time, the initial pose estimating device 120 may estimate the initial pose of the SLAM system 100 by using the matched feature points and the matched line segment features.

Additionally, when the number of the matched feature points is less than a second preset threshold value (herein, the second preset threshold value is less than the first preset threshold value), the initial pose estimating device 120 may directly determine the initial pose of the SLAM system 100 to remain the same as a relative pose of the SLAM system 100 in a particular frame.

Herein, the particular frame may be a previous frame or several surrounding frames of the current frame.

Optionally, although not shown in the flowchart of FIG. 11, the method may further include an operation of determining a common-view key frame.

In an example, the full-image tracking device described above may be used to determine, in a previous frame (for example, a previous key frame), a common-view key frame having a common viewpoint with the current frame.

Accordingly, in operation 1120, the initial pose estimating device 120 may further use the common-view key frame to estimate the initial pose, which may enhance the accuracy of the SLAM system 100.

Next, in operation 1130, the map constructing device 130 may be used to construct a three-dimensional map based on the depth images and color images.

The map constructing device 130 may, when entering a particular environment for the first time, reconstruct an initial three-dimensional map based on a first depth image and a first color image of the particular environment, and then update the three-dimensional map based on a second depth image and a second color image when entering the particular environment again.

Specifically, when the SLAM system 100 enters a particular environment for the first time, the map constructing device 130 may reconstruct a three-dimensional map based on the depth images and color images obtained by the image obtaining device 110 when entering the particular environment for the first time, determine three-dimensional coordinates of each map point of the reconstructed three-dimensional map and spatial accuracy of each map point, and store the three-dimensional coordinates and spatial accuracy of each map point on the reconstructed three-dimensional map.

Herein, since the SLAM system 100 does not obtain a space-time confidence value when entering a particular environment for the first time, the space-time confidence value of the map point on the current three-dimensional map may be set to zero and stored.

Thereafter, when the SLAM system enters again the particular environment, the map constructing device 130 may calculate the three-dimensional coordinates of each map point and the space-time confidence value corresponding to each map point based on the depth images and color images obtained by the image obtaining device 110 when entering again the particular environment, and update the three-dimensional coordinates of corresponding map points on the stored three-dimensional map and the space-time confidence value corresponding to each map point according to the calculated three-dimensional coordinates of each map point and the space-time confidence the space-time confidence value corresponding to each map point.

The updated three-dimensional map may be used as a three-dimensional map constructed by the map constructing device 130 for subsequent use.

In operation 1140, the pose determining device 140 may determine the final pose of the SLAM system 100 based on the initial pose of the SLAM system 100 estimated in operation 1120 and the three-dimensional map constructed in operation 1130.

Herein, as described above, the pose determining device 140 may determine the final pose by using a preset frame set based on the initial pose and the three-dimensional map.

The preset frame-set may include a plurality of tracking subsets obtained by dividing a tracking set related to a current frame.

Optionally, the pose determining device 140 may also set a time domain window of a preset size with respect to a current frame, and determine the final pose by using a key frame in the time domain window based on the initial pose and the three-dimensional map.

Optionally, when extraction and matching of line segment features are performed in operation 1120, the method may also use a point and line optimization combination device to establish a three-dimensional collinear constraint according to matching results of the line segment features, such that the pose determining device 140 may determine the final pose by further using the three-dimensional collinear constraint.

This may further improve the accuracy of the SLAM system 100.

Finally, in operation 1150, the storage device 150 may store current frame related information including the final pose of the SLAM system 100.

Operations performed by various components of the SLAM system 100 according to an example in each operation of FIG. 11 have been described in detail above with reference to FIGS. 1 to 10D. Therefore, redundant descriptions thereof will be omitted for simplicity of the present disclosure.

The SLAM system 100 and method according to an example, may ensure real-time mapping, reduce an amount of calculation, and also ensure mapping accuracy.

Additionally, the examples described in the present disclosure are merely examples for ease of understanding, and the present disclosure is not limited thereto. It is to be appreciated that all changes, equivalents, and substitutes that do not depart from the spirit and technical scope are encompassed in the present disclosure.

The SLAM system 100, the image obtaining device 110, the initial pose estimating device 120, the map constructing device 130, the pose estimating device 140, the storage device 150, the feature extractor 121, the feature matcher 122, the estimator 123, the map reconstructor 131, the map storage device 132, and the map updater 133 with respect to FIGS. 1-10D, and that perform operations described in this application are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods of FIGS. 1-10D that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A simultaneous localization and mapping device, the device comprising:
    a processor configured to:
        estimate an initial pose based on color images and depth images;
        construct a three-dimensional map based on the depth images and the color images; and
        determine a final pose based on the initial pose and the three-dimensional map,
    wherein, for the estimating of the initial pose, the processor is configured to selectively estimate the initial pose based on matched line segment features.

2. The device of claim 1, wherein, for the constructing of the three-dimensional map, the processor is configured to:
    reconstruct an initial three-dimensional map based on a first depth image and a first color image of a surrounding environment; and
    update the three-dimensional map based on a second depth image and a second color image of the surrounding environment.

3. The device of claim 2, wherein, for the updating of the three-dimensional map, the processor is configured to update positional information of points, of the three-dimensional map constructed at a first time, based on spatial-temporal confidence information determined at a second time for the points.

4. The device of claim 3, wherein the processor is further configured to create a three-dimensional collinear constraint based on the matched line segment features,
    wherein the final pose is further determined based on the three-dimensional collinear constraint, and
    wherein the three-dimensional collinear constraint indicates that a point on a line segment of a first frame is on a corresponding line segment of a second frame.

5. The device of claim 1, wherein, for the initial pose estimating, the processor is further configured to:
    extract feature points from the color images;
    perform point-matching on the extracted feature points as matched feature points; and
    estimate the initial pose based on the matched feature points,
    wherein the processor is further configured to, when a number of the matched feature points is less than a first threshold value,
        extract line segment features from the color images,
        perform line segment matching on the line segment features to determine the matched line segment features, and
        estimate the initial pose further based on the matched line segment features.

6. The device of claim 5, wherein a performance of the line segment matching is based on geometric structure information around the line segment features.

7. The device of claim 5, wherein the processor is further configured to:
    create a three-dimensional collinear constraint based on matching results of the line segment features; and
    determine the final pose based on the three-dimensional collinear constraint, and
    wherein the three-dimensional collinear constraint indicates that a point on a line segment of a first frame is on a corresponding line segment of a second frame.

8. The device of claim 1, wherein the processor is further configured to determine, in a previous key frame, a key frame having a common viewpoint with a current frame, and
    wherein the estimation of the initial pose based on the determined key frame based on the color images and the depth images.

9. The device of claim 1, wherein, for the determination of the final pose, the processor is configured to determine the final pose by using a preset frame set based on the initial pose and the three-dimensional map, and
    the preset frame set comprises a plurality of tracking subsets obtained by dividing a tracking set related to a current frame.

10. The device of claim 1, wherein, for the determination of the final pose, the processor is configured to set a time domain window of a preset size with respect to a current frame, and determine the final pose by using a key frame in the time domain window based on the initial pose and the three-dimensional map.

11. The device of claim 1, wherein the color images and depth images are obtained with respect to one or more cameras that respectively capture the color images and depth images.

12. A processor-implemented simultaneous localization and mapping method, the method comprising:
    estimating an initial pose based on captured color images and captured depth images;
    constructing a three-dimensional map based on the captured depth images and the captured color images; and
    determining a final pose based on the initial pose and the three-dimensional map;
    wherein the estimating of the initial pose further comprises selectively estimating the initial pose based on matched line segment features.

13. The method of claim 12, wherein the constructing of the three-dimensional map comprises:

reconstructing an initial three-dimensional map based on a first depth image and a first color image of a surrounding environment; and updating the three-dimensional map based on a second depth image and a second color image of the surrounding environment.

14. The method of claim 12, wherein the estimating of the initial pose further comprises:

extracting feature points from the captured color images as extracted feature points;

performing point-matching on the extracted feature points; and estimating the initial pose by using the matched feature points, wherein, when a number of the matched feature points is less than a first threshold value, the estimating of the initial pose further comprises extracting line segment features from the color images, performing line segment matching on the line segment features to generate the matched line segment features, and estimating the initial pose further based on the matched line segment features.

15. The method of claim 14, wherein the performing of the line segment matching on the line segment features comprises performing line segment matching according to geometric structure information around the line segment features.

16. The method of claim 14, further comprising creating a three-dimensional collinear constraint based on matching results of the line segment features, wherein the determining of the final pose further comprises determining the final pose based on the three-dimensional collinear constraint, and the three-dimensional collinear constraint indicates that a point on a line segment of a first frame is on a corresponding line segment of a second frame.

17. The method of claim 12, further comprising determining, in a previous key frame, a key frame having a common viewpoint with a current frame, wherein the estimating of the initial pose comprises estimating the initial pose by using the determined key frame based on the captured color images and the captured depth images.

18. The method of claim 12, wherein the determining of the final pose comprises determining the final pose by using a preset frame set based on the initial pose and the three-dimensional map, and the preset frame set comprises a plurality of tracking subsets obtained by dividing a tracking set related to a current frame.

19. The method of claim 12, wherein the determining of the final pose comprises setting a time domain window of a preset size with respect to a current frame, and determining the final pose by using a key frame in the time domain window based on the initial pose and the three-dimensional map.

20. An electronic device configured to perform simultaneous localization and mapping (SLAM), the electronic device comprising:

one or more cameras configured to capture a first color image and a first depth image of an environment at a first time period; and a processor configured to:

extract feature points from the first color image, and estimate an initial pose based on matched points of the extracted feature;

construct a three-dimensional map based on the first color image and the first depth image;

construct an updated three-dimensional map, based on a second color image and a second depth image of the environment captured at a second time period, by updating positional information of points, of the three-dimensional map, based on spatial-temporal confidence information determined in the second time period for the points; and determine a final pose based on the initial pose and the updated three-dimensional map.

21. The electronic device of claim 20, wherein the final pose is further determined based on a preset frame.

22. The electronic device of claim 20, wherein, for the estimating of the initial pose, the processor is configured to selectively estimate the initial pose based on matched line segment features of extracted line segment features.

23. The electronic device of claim 20, wherein, for the construction of the updated three-dimensional map, the processor is configured to perform a three-dimensional semantic reconstruction of the three-dimensional map, and wherein the spatial-temporal confidence information of the second time period for the points is based on respective information of a previous time, a current time, and a reprojection error of the point in the three-dimensional semantic reconstruction.

* * * * *